(12) United States Patent
Iwamoto

(10) Patent No.: US 11,473,535 B2
(45) Date of Patent: Oct. 18, 2022

(54) EVAPORATED FUEL TREATMENT DEVICE

(71) Applicant: FUTABA INDUSTRIAL CO., LTD., Aichi (JP)

(72) Inventor: Koji Iwamoto, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 17/328,185

(22) Filed: May 24, 2021

(65) Prior Publication Data

US 2021/0388798 A1 Dec. 16, 2021

(30) Foreign Application Priority Data

Jun. 12, 2020 (JP) .............................. JP2020-102533

(51) Int. Cl.
*F02M 33/02* (2006.01)
*F02M 25/08* (2006.01)
*B01D 53/04* (2006.01)

(52) U.S. Cl.
CPC ..... *F02M 25/0854* (2013.01); *B01D 53/0446* (2013.01); *B01D 2253/102* (2013.01); *B01D 2253/3425* (2013.01); *B01D 2259/402* (2013.01); *B01D 2259/41* (2013.01); *B01D 2259/4516* (2013.01)

(58) Field of Classification Search
CPC ............. F02M 25/089; F02M 25/0854; F02M 25/0872; F02M 25/0336; F02M 25/0836; F02D 41/003
See application file for complete search history.

(56) References Cited

U.S. PATENT DOCUMENTS

| 2011/0315126 | A1 | 12/2011 | Yoshida et al. |
| 2013/0037006 | A1 | 2/2013 | Kosugi et al. |
| 2013/0284154 | A1 | 10/2013 | Makino |
| 2018/0283322 | A1* | 10/2018 | Kuboyama .......... F02M 25/089 |
| 2022/0040627 | A1* | 2/2022 | Seki ..................... B60K 15/035 |

FOREIGN PATENT DOCUMENTS

| JP | 2012007501 A | 1/2012 |
| JP | 5015344 B2 | 8/2012 |
| JP | 2013036416 A | 2/2013 |
| JP | 2013231380 A | 11/2013 |
| JP | 2015124645 A | 7/2015 |
| JP | 6507092 B2 | 4/2019 |

OTHER PUBLICATIONS

Notice of Reasons for Refusal, and its English translation, for JP2020-102533, dated Apr. 19, 2022.

* cited by examiner

*Primary Examiner* — John Kwon
(74) *Attorney, Agent, or Firm* — David D. Brush; Westman, Champlin & Koehler, P.A.

(57) ABSTRACT

An evaporated fuel treatment device includes a main adsorption chamber and a sub adsorption chamber. The sub adsorption chamber includes a first adsorption layer, a second adsorption layer and a high-desorption layer. The second adsorption layer is situated closer to an atmosphere port than the first adsorption layer is, and has a lower performance of adsorbing fuel vapor than the first adsorption layer does. The high-desorption layer is situated closer to the main adsorption chamber than the first adsorption layer is, and a higher performance of desorbing the fuel vapor than the first adsorption layer or the second adsorption layer does.

6 Claims, 2 Drawing Sheets

EVAPORATED FUEL TREATMENT DEVICE

CROSS-REFERENCE TO RELATED APPLICATION

The present application claims the benefit of Japanese Patent Application No. 2020-102533 filed on Jun. 12, 2020 with the Japan Patent Office, the entire disclosure of which is incorporated herein by reference.

BACKGROUND

The present disclosure relates to an evaporated fuel treatment device to adsorb fuel vapor generated from a fuel tank.

There has been known an evaporated fuel treatment device in which an adsorbent such as activated carbon is disposed. The evaporated fuel treatment device is provided with an inflow port connected to a fuel tank and an outflow port connected to an internal combustion engine. Fuel vapor flowing in from the inflow port is adsorbed on the adsorbent disposed in each of chambers provided in the evaporated fuel treatment device. The evaporated fuel treatment device is also provided with an atmosphere port. When the evaporated fuel treatment device desorbs the adsorbed fuel vapor and sends it to the internal combustion engine, which is what is called purging, the purge air is caused to flow in from outside of a vehicle via the atmosphere port. The fuel adsorbed on the adsorbent is removed by the purge air and the removed fuel outflows from the outflow port toward the internal combustion engine.

Japanese Patent No. 6507092 discloses an evaporated fuel treatment device including a third chamber provided with a low-adsorptive layer and a high-adsorptive layer which are disposed near the atmosphere port, in which the low-adsorptive layer is disposed closer to the atmosphere port than the high-adsorptive layer is. The third chamber functions as a trap device for suppressing release of fuel vapor from the atmosphere port. Moreover, Patent Document 1 discloses a configuration in which a honeycomb-shaped activated carbon is disposed between a low-adsorptive layer and an atmosphere port.

SUMMARY

It has been a recent trend that purge air amount is reduced in order to cope with regulations such as fuel consumption regulation. When purge air amount is reduced, fuel vapor is likely to remain inside of an evaporated fuel treatment device. Accordingly, the fuel vapor is likely to outflow from the atmosphere port.

It is preferable that one aspect of the present disclosure provides an evaporated fuel treatment device with an improved performance.

One aspect of the present disclosure is an evaporated fuel treatment device comprising: an inflow port; an outflow port; and an atmosphere port. The evaporated fuel treatment device accumulates fuel vapor flowing in from a fuel tank via the inflow port. Furthermore, the evaporated fuel treatment device causes the accumulated fuel vapor to flow to an internal combustion engine via the outflow port by using air flowing in from the atmosphere port.

The evaporated fuel treatment device comprises a main adsorption chamber and a sub adsorption chamber. The main adsorption chamber is connected to the inflow port and the outflow port, and provided therein with an adsorbent for adsorbing fuel vapor. The sub adsorption chamber is connected to the atmosphere port, and provided therein with an adsorbent for adsorbing fuel vapor. The sub adsorption chamber comprises: a first adsorption layer; a second adsorption layer; and a high-desorption layer. The second adsorption layer is situated closer to the atmosphere port than to the first adsorption layer is, and has a lower performance of adsorbing fuel vapor than the first adsorption layer does. The high-desorption layer is situated closer to the main adsorption chamber than the first adsorption layer is, and has a higher performance of desorbing fuel vapor than the first adsorption layer or the second adsorption layer does.

This configuration allows the first adsorption layer, which is situated further to the atmosphere port than the second adsorption layer is, to adsorb larger amount of fuel vapor. Thus, it is possible to reduce the amount of fuel kept in an area close to the atmosphere port, and consequently to suppress outflow of the fuel vapor from the atmosphere port. Furthermore, the sub adsorption chamber is capable of favorably desorbing the fuel vapor from the adsorbent with a small amount of purge air. The reasons for this are as follows: i) at the time of purging, fuel vapor is efficiently desorbed by clean air flowing in from the atmosphere port in the first adsorption layer and the second adsorption layer, and ii) the high-desorption layer has a high performance of desorbing fuel vapor, and thus the fuel vapor is favorably desorbed even by the purge air having passed through the first adsorption layer and the second adsorption layer. In the evaporated fuel treatment device with the above-described configuration, it is possible to suppress the outflow of the fuel vapor from the atmosphere port as well as to favorably desorb the fuel vapor at the time of purging.

The above-described high-desorption layer may be provided therein with an activated carbon formed in honeycomb shape. With this configuration, desorption performance of the high-desorption layer can be improved. The reason for this is that a thickness of the activated carbon is reduced owing to the honeycomb shape of the activated carbon, and thus the fuel vapor adsorbed on inner parts of pores of the activated carbon is easily desorbed.

The above-described main adsorption chamber may comprise a first main adsorption chamber and a second main adsorption chamber that are connected to each other via a communicating passage. The first main adsorption chamber and the second main adsorption chamber may be arranged such that, when fuel vapor flows in from the fuel tank, a flow direction of the fuel vapor in the first main adsorption chamber is opposite to a flow direction of the fuel vapor in the second main adsorption chamber, and such that, at the same time, the first main adsorption chamber and the second main adsorption chamber are aligned along a direction perpendicular to the flow direction in the fuel vapor in the first main adsorption chamber.

In this configuration, shape restriction on the main adsorption chamber can be reduced, consequently a number of possible shapes of the evaporated fuel treatment device is increased. Accordingly, the evaporated fuel treatment device can be easily mounted, for example, in an engine compartment, where a space available is limited.

In one aspect of the present disclosure, the first adsorption layer and the second adsorption layer may comprise activated carbons as adsorbents. In this configuration, adsorption performance of a two-layered structured portion can be extremely improved. Accordingly, adsorption capacity of the evaporated fuel treatment device as whole can be improved.

The adsorbent that is provided in the above-described high-desorption layer may include a thin-plate-shaped portion. With this configuration, a specific surface area of the adsorbent is increased, and thus the desorption performance of the high-desorption layer can be improved.

The above-described first adsorption layer and the second adsorption layer may comprise granular or pellet-formed members as adsorbents. The above-described thin-plate-shaped portion may be thinner than the granular or pellet-formed members. This configuration can easily make the desorption performance of the high-desorption layer higher than that of the first adsorption layer or the second adsorption layer.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Embodiments

[1-1. Overall Configuration]

Figure 1:
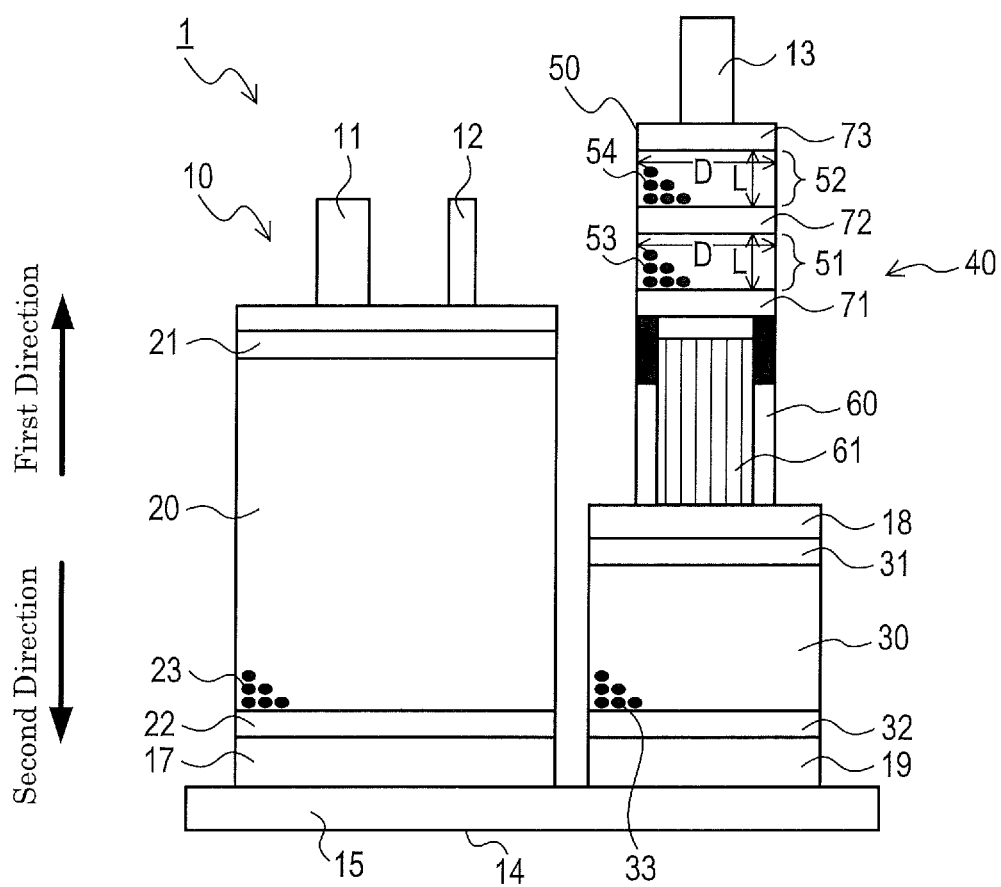
FIG. 1 is an explanatory diagram schematically showing an internal structure of an evaporated fuel treatment device according to an embodiment.

An evaporated fuel treatment device 1 shown in FIG. 1 comprises a housing 10 made from synthetic resin. The housing comprises: a first main adsorption chamber 20; a second main adsorption chamber 30; and a sub adsorption chamber 40. The evaporated fuel treatment device 1 further comprises: an inflow port 11; an outflow port 12; an atmosphere port 13; and a lid member 14, which are disposed in the housing 10.

The inflow port 11 and the outflow port 12 are disposed at an end of the first main adsorption chamber 20 along a first direction. The lid member 14 is disposed at an end of the first main adsorption chamber 20 along a second direction, the second direction being a direction opposite to the first direction. The lid member 14 has a width along a direction perpendicular to the second direction. The first main adsorption chamber 20 and the second main adsorption chamber 30 are disposed on the first direction side of the lid member 14. The first main adsorption chamber 20 and the second main adsorption chamber 30 are connected to each other via a communicating passage 15 that is formed inside of the lid member 14. The sub adsorption chamber 40 is disposed at an end of the second main adsorption chamber 30 along the first direction. The atmosphere port 13 is disposed at an end of the sub adsorption chamber 40 along the first direction.

An adsorbent is disposed in the housing 10. The evaporated fuel treatment device 1 accumulates fuel vapor in the adsorbent, the fuel vapor flowing in from a fuel tank, which is not shown in the drawings, via the inflow port 11. Furthermore, the evaporated fuel treatment device 1 causes the accumulated fuel vapor to flow out to an internal combustion engine via the outflow port 12 by using air flowing in from outside via the atmosphere port 13.

In order to facilitate understanding of the description, fuel vapor flowing in from the fuel tank will be described as "fuel vapor", even in a state of being adsorbed. Fuel vapor mainly contains hydrocarbon.

The first main adsorption chamber 20 and the second main adsorption chamber 30 are configured mainly for a purpose of adsorbing and accumulating a large amount of fuel vapor. Hereinafter, the first main adsorption chamber 20 and the second main adsorption chamber 30 together may be referred to as "main adsorption chambers". Meanwhile, the sub adsorption chamber 40 functions to adsorb fuel vapor and also functions as a trap device to suppress outflow of the fuel vapor from the atmosphere port 13.

The inflow port 11 is connected, via a valve, to a fuel tank of a vehicle to which the evaporated fuel treatment device 1 is mounted. Once flowing into the evaporated fuel treatment device 1 via the inflow port 11, the fuel vapor generated from the fuel accumulated in the fuel tank is adsorbed on the adsorbent disposed in each of the chambers. In such a configuration, fuel is accumulated in the evaporated fuel treatment device 1.

The outflow port 12 is connected to an intake pipe of an internal combustion engine of the vehicle via a valve. The atmosphere port 13 is connected to externals of the internal combustion engine and the evaporated fuel treatment device 1. In the present embodiment, the atmosphere port 13 is connected to the external of the vehicle. Air in the atmosphere (hereinafter referred to as "purge air") flows into the evaporated fuel treatment device 1 via the atmosphere port 13 due to intake negative pressure of the internal combustion engine. At this time, the fuel vapor adsorbed on the adsorbent is desorbed by the purge air, and the desorbed fuel vapor is caused to flow out toward the intake pipe via the outflow port 12. This results in removal of the fuel adsorbed on the adsorbent and regeneration of the adsorbent. Hereinafter, regenerating the adsorbent the adsorbent by discharging the adsorbed fuel vapor as described above will be referred to as "purging."

[1-2. Main Adsorption Chamber]

The first main adsorption chamber 20 is connected to the inflow port 11 and the outflow port 12. The first main adsorption chamber 20 is provided therein with an adsorbent 23 for adsorbing fuel vapor.

The first main adsorption chamber 20 has a hollow, substantially rectangular parallelepiped shape. In the first main adsorption chamber 20, a filter 21 is disposed at an end on the first direction side, and a filter 22 and a porous plate 17 are disposed at an end on the second direction side. The adsorbent 23 is filled between the filter 21 and the filter 22. The filter 21 and the filter 22 are configured so as not to allow any fillers to pass therethrough but to allow gases such as fuel vapor and the like to pass therethrough. Similarly to the filter 22, the porous plate 17 allows gases to pass therethough. The porous plate 17 may support the filter 22. The porous plate 17 is biased toward the first direction by a biasing component such as a coil spring (not shown) or the like.

The second main adsorption chamber 30 is situated between the first main adsorption chamber 20 and the sub adsorption chamber 40 in relation to a passage in which gases flow. The second main adsorption chamber 30 is provided therein with an adsorbent 33 for adsorbing fuel vapor. In the second main adsorption chamber 30, a filter 31 and a porous plate 18 are disposed at an end on the first direction side, and a filter 32 and a porous plate 19 are disposed at an end on the second direction side. The adsorbent 33 is filled between the filter 31 and the filter 32. Similarly to the filter 21 and the filter 22, the filter 31 and the filter 32 are configured so as not to allow any fillers to pass therethrough but to allow gases such as fuel vapor and the like to pass therethrough. The porous plate 18 and the porous plate 19 each have the same configuration as that of the porous plate 17. The porous plate 19 is biased toward the first direction by a biasing component such as a coil spring (not shown) or the like.

When flowing into the first main adsorption chamber 20 from the fuel tank, fuel vapor flows in the second direction. On the other hand, when flowing into the second main adsorption chamber 30, fuel vapor flows in the first direction. That is, the first main adsorption chamber 20 and the second main adsorption chamber 30 are arranged such that, when the fuel vapor flows in from the fuel tank, a flow direction of the fuel vapor in the first main adsorption chamber 20 and a flow direction of the fuel vapor in the second main adsorption chamber 30 are opposite directions to each other. Also, the first main adsorption chamber 20 and the second main adsorption chamber 30 are arranged such that they are aligned along a direction perpendicular to the flow direction of the fuel vapor in the first main adsorption chamber 20.

[1-3. Sub Adsorption Chamber]

The sub adsorption chamber 40 is situated between the second main adsorption chamber 30 and the atmosphere port 13 in relation to the passage in which gases flow. The sub adsorption chamber 40 is provided therein with an adsorbent for adsorbing fuel vapor. The sub adsorption chamber 40 comprises a layered portion 50 and a high-desorption layer 60.

The layered portion 50 is formed as an elongated space having a constant width. In the present embodiment, the layered portion 50 has a hollow column shape with a circular cross-section taken along a plane perpendicular to the flow direction of air (that is, the first direction or the second direction). However, the shape of the layered portion 50 is not limited to this, but the layered portion 50 may be formed, for example, to have a polygonal-column shape.

The layered portion 50 comprises a first adsorption layer 51 and a second adsorption layer 52. The first adsorption layer 51 is situated on a side closer to the main adsorption chambers than the second adsorption layer 52 is, and is provided therein with a first adsorbent 53. The second adsorption layer 52 is situated on a side closer to the atmosphere port 13 than the first adsorption layer 51 is, and provided therein with a second adsorbent 54. Each of the adsorption layers will be detailed later. Here, elements are determined as being close to or distant from one another based on a passage in which fuel vapor flows. That is, fuel vapor traveling from the main adsorption chamber (specifically, the second main adsorption chamber 30) toward the atmosphere port 13 enters into the first adsorption layer 51 first and then into the second adsorption layer 52. At the time of purging, purge air having flown in via the atmosphere port 13 enters into the second adsorption layer 52 first and then into the first adsorption layer 51.

A filter 71 is provided at the second direction side end of the first adsorption layer 51. A filter 72 is provided at an end of the first adsorption layer 51 on the first direction side, in other words, between the first adsorption layer 51 and the second adsorption layer 52. A filter 73 is provided at the first direction side end of the second adsorption layer 52. The first adsorbent 53 configuring the first adsorption layer 51 is disposed between the filter 71 and the filter 72. The second adsorbent 54 configuring the second adsorption layer 52 is disposed between the filter 72 and the filter 73.

The high-desorption layer 60 is disposed on a side closer to the second main adsorption chamber 30 than the first adsorption layer 51 of the layered portion 50 is. The high-desorption layer 60 comprises a third adsorbent 61, which has a higher performance of desorbing fuel vapor than the first adsorption layer 51 or the second adsorption layer 52 does. Here, as previously described, elements are determined as being close to or distant from one another based on the passage in which fuel vapor flows. The third adsorbent 61 is an activated carbon formed in honeycomb shape. The adsorbent will be detailed later.

As described above, in the sub adsorption chamber 40, the second adsorption layer 52, the first adsorption layer 51, and the third adsorbent 61 are arranged in this order from the end side in the first direction to the second direction. At the time of keeping fuel vapor in the sub adsorption chamber 40, the fuel vapor flows in from the second main adsorption chamber 30 through the third adsorbent 61, the first adsorption layer 51, and the second adsorption layer 52 in this order. Air having been present inside of the evaporated fuel treatment device 1 is discharged via the atmosphere port 13. On the other hand, at the time of purging, purge air entering from the atmosphere port 13 passes through the second adsorption layer 52, the first adsorption layer 51 and the high-desorption layer 60 in this order, and flows into the second main adsorption chamber 30.

Structures and arrangements of the above-described filters and porous plates are not especially limited. The filters and porous plates may have a variety of configurations as long as the adsorbent is restrained from moving and air is movable therein.

[1-4. Adsorbents Disposed in Sub Adsorption Chamber]

Both the first adsorbent 53 configuring the first adsorption layer 51 and the second adsorbent 54 configuring the second adsorption layer 52 are activated carbons. The first adsorbent 53 and the second adsorbent 54 are formed in granular shape or pellet form with cylindrical shape or the like, and are filled in a given space of the sub adsorption chamber 40. In other words, the first adsorption layer 51 is configured by multiple first adsorbents 53, and the second adsorption layer 52 is configured by multiple second adsorption layers 52.

The second adsorption layer 52 has a lower performance of adsorbing fuel vapor than the first adsorption layer 51 does. The performance of adsorbing fuel vapor here means a capacity of fuel vapor adsorption performed by whole activated carbons that form each layer. The adsorption capacity means butane working capacity (i.e., BWC) as defined by ASTM 5228. Any specific configuration to differentiate the performances of adsorbing fuel vapor between the first adsorption layer 51 and the second adsorption layer 52 is not particularly limited. The performance of adsorbing fuel vapor may be differentiated by adjusting, for example, a thickness of each layer, a physical property of the adsorbent, a filling amount of the adsorbent, a shape of the adsorbent, a structure of the adsorbent and the like.

Each layer may be provided therein with an activated carbon that is selected from, for example, those having an adsorption capacity of 17 g/dL, 15 g/dL, 11 g/dL, 9 g/dL or 7 g/dL. Specific examples of such activated carbon can include activated carbons manufactured by Ingevity: BAX1700; BAX1500; BAX1100; and BAX LBE.

A length of each of the first adsorption layer 51 and the second adsorption layer 52 of the sub adsorption chamber 40 along a flow direction of fuel vapor is denoted with "L". The flow direction is a direction along the first direction or the second direction. Besides, a length of the first adsorption layer 51 and the second adsorption layer 52 along a direction perpendicular to the first direction is denoted with "D". The aforementioned direction is a width direction of each of the first adsorption layer 51 and the second adsorption layer 52. D corresponds to a diameter of the cylindrical hollow portion of the layered portion 50. D may be smaller than a width of an internal space of the second main adsorption chamber 30.

L of the first adsorption layer 51 may be shorter than L of the second adsorption layer 52. Also, L/D of the first adsorption layer 51 and L/D of the second adsorption layer 52 may be less than 1. As a matter of course, the length is not limited to the above-described length, and L of the first adsorption layer 51 may be longer than L of the second adsorption layer 52. Also, either or both of L/D of the first adsorption layer 51 and L/D of the second adsorption layer 52 may be 1 or more.

An amount of purge air flowing in from the atmosphere port 13 by purging is defined as purge amount. The L and D values of the respective layers, L/D, the ratio among the L values of the respective layers, and the kinds of the activated carbons in the respective layers may be selected so that the fuel adsorbed on the activated carbon disposed in the sub adsorption chamber 40 is sufficiently removed by inflow, from the atmosphere port 13, of purge air at a purge amount as defined according to the type of the vehicle.

The third adsorbent 61 disposed in the high-desorption layer 60 is a cylindrical member having a honeycomb shape, with a capability of adsorbing and desorbing fuel vapor. The third adsorbent 61 may be formed as a single mass. The honeycomb shape here broadly includes a shape in which a plurality of cells extending along the same direction are formed, the plurality of cells acting as flow passages of fluid. For example, cross-sections of the cells each may have an exact honeycomb shape in a form of a substantial hexagon, or may have a circular, rectangular, triangular, rhombic shape, etc.

A wall forming each of the above-described cells of the third adsorbent 61 may be composed of activated carbon. For example, the third adsorbent 61 may be formed by solidifying activated carbon with a binder. Since the third adsorbent 61 with a honeycomb structure has a hollow interior, the wall is small in thickness as compared with, for example, a case where an activated carbon with the same adsorption capacity as that of the third adsorbent 61 is formed in granular or pellet form. The smaller the thickness of the activated carbon is, the more easily the fuel vapor adsorbed on inner parts of pores of the activated carbon is desorbed. As such, the high-desorption layer 60 comprising the third adsorbent 61 has a higher performance of desorbing fuel vapor than the first adsorption layer 51 and the second adsorption layer 52, which comprise the first adsorbent 53 and the second adsorbent 54, respectively.

A method for comparing the desorption performance will be described. Hydrocarbon components are adsorbed on the activated carbon until a breakthrough of the hydrocarbon components occurs, and then a flow of clean air of such an amount that the adsorbed hydrocarbon components are not fully desorbed is provided to the activated carbon, under flow velocity conditions substantially the same as those for purging in a vehicle. Subsequently, a percentage of the desorbed hydrocarbon components to the adsorbed hydrocarbon components is determined. It is determined that the larger the percentage is, the higher the desorption performance is.

[1-5. Effect]

(1a) In the layered portion 50 of the evaporated fuel treatment device 1, more amount of fuel vapor can be adsorbed in the first adsorption layer 51, which is situated further from the atmosphere port 13 than the second adsorption layer 52 is. Therefore, it is possible to keep a large amount of fuel in an area distant from the atmosphere port 13 and to reduce the amount of fuel kept in an area close to the atmosphere port 13, and consequently to suppress the outflow of fuel vapor from the atmosphere port 13.

Furthermore, the sub adsorption chamber 40 is capable of favorably desorbing fuel vapor from the adsorbent with a small amount of purge air. This is because the layered portion 50 is disposed closer to the atmosphere port 13 than the high-desorption layer 60 is, and thus at the time of purging, fuel vapor is efficiently desorbed by the clean air flowing in from the atmosphere port 13. Besides, the high-desorption layer 60 has a high performance of desorbing fuel vapor, and thus even if the fuel vapor desorbed in the layered portion 50 is adsorbed again in the high-desorption layer 60, such fuel vapor is not likely to stay in the high-desorption layer 60 but is likely to be desorbed. Accordingly, the sub adsorption chamber 40 has a high performance of desorbing fuel vapor.

With the evaporated fuel treatment device 1 configured as the above-described, it is possible to suppress the outflow of fuel vapor from the atmosphere port 13 as well as to achieve an efficient desorption of fuel vapor at the time of purging.

(1b) Owing to having the honeycomb shape, the third adsorbent 61 has a high desorption performance of fuel vapor. Accordingly, the sub adsorption chamber 40 can have an extremely high desorption performance of fuel vapor, and the outflow of fuel vapor from the atmosphere port 13 can be highly suppressed. Moreover, the adsorbed fuel vapor can be sufficiently removed by purging with a small amount of purge air while an amount of fuel vapor accumulated in the sub adsorption chamber 40 can be increased.

(1c) The first main adsorption chamber 20 and the second main adsorption chamber 30 are arranged along the same direction with respect to the lid member 14. Thus, increase in length of the evaporated fuel treatment device 1 as whole can be suppressed, shape restriction on the main adsorption chambers as whole can be reduced, and consequently a number of possible shapes of the evaporated fuel treatment device 1 is increased. This allows a use of the evaporated fuel treatment device 1, for example, even in an engine compartment where a space available is limited.

(1d) Since activated carbon is employed as an adsorbent in the layered portion 50, the layered portion 50 can have an extremely high performance of adsorbing fuel vapor. Thus, the adsorption capacity of the evaporated fuel treatment device 1 as whole can be improved.

(1e) L/D of each of the first adsorption layer 51 and the second adsorption layer 52 is set to less than 1. This enables shortening L of the layered portion 50 while suppressing lowering of fuel vapor adsorption power of the layered portion 50 as whole. It further enables favorably keeping fuel vapor released from the second main adsorption chamber 30 in the layered portion 50 as well as removing the fuel vapor adsorbed on the adsorbent in the sub adsorption chamber 40 with a small purge amount.

Owing to low L/D of the layered portion 50, it is possible to suppress ventilation resistance when air having flown in from the fuel tank during oil feeding passes through the evaporated fuel treatment device 1. Also, owing to small L of the layered portion 50, it is possible to downsize the evaporated fuel treatment device 1.

2. Other Embodiments

The embodiments of the present disclosure have been described in the above. The present disclosure is not limited to the aforementioned embodiments and can be practiced in various forms.

(2a) The aforementioned embodiment exemplifies a configuration in which the high-desorption layer 60 comprises an activated carbon formed in honeycomb shape as the third adsorbent 61. However, the specific configuration of the high-desorption portion is not particularly limited as long as the desorption performance of the high-desorption portion is higher than that of the first adsorption layer or the second adsorption layer. For example, multiple thin-plate-shaped pellets may be employed as the third the adsorbent. The thin-plate-shaped pellets each may be formed with a thickness thinner than that of the first adsorbent 53 or the second adsorbent 54. An adsorbent formed from a material having a higher desorption performance than the first the adsorbent and the second the adsorbent may be employed as a third adsorbent. The adsorption capacity of the third adsorbent 61 may be either higher or lower than that of the high-desorption layer 60. Although the thickness of the wall forming the honeycomb structure of the third adsorbent 61 is not particularly limited in the aforementioned embodiment, the wall may include a portion formed to have a thickness thinner than that of the first adsorbent 53 or the second adsorbent 54. In other words, the third adsorbent 61 may include a thin-plate-shaped portion having a thickness thinner than that of the first adsorbent 53 or the second adsorbent 54.

(2b) The aforementioned embodiment exemplifies a configuration in which activated carbon is employed as the adsorbent. However, an adsorbent other than the activated carbon may be employed as a part of or a whole of the adsorbent. The aforementioned embodiment also exemplifies a configuration in which a pellet-formed activated carbon is employed as the adsorbent other than the third adsorbent 61, the adsorbent, however, may be in a form other than the pellet form. For example, the activated carbon used as the adsorbent may be one or a plurality of activated carbons formed into lumps by integrating a plurality of pellets.

(2c) The aforementioned embodiment exemplifies a configuration in which the first main adsorption chamber 20 and the second main adsorption chamber 30 connected to each other via the communicating passage 15 are provided as the main adsorption chambers. However, the main adsorption chambers each may have a configuration other than the aforementioned one. For example, the main adsorption chamber may be a single adsorption chamber without comprising the lid member 14. Furthermore, the main adsorption chamber may comprise three or more adsorption chambers.

Although the aforementioned embodiment exemplifies a configuration in which the first main adsorption chamber 20 and the second main adsorption chamber 30 are connected to each other via the communicating passage 15 that is provided in the lid member 14, the configuration of the communicating passage is not particularly limited. For example, the first main adsorption chamber 20 and the second main adsorption chamber 30 may be connected to each other via a tube.

(2d) The aforementioned embodiment exemplifies a configuration in which the sub adsorption chamber 40 comprises the third adsorbent 61, the first adsorption layer 51, and the second adsorption layer 52 which are connected in series. However, the configuration of the sub adsorption chamber 40 is not limited to this. For example, the layered portion 50 may comprise layers other than the first adsorption layer 51 and the second adsorption layer 52. In such a configuration, it is sufficient if at least two layers are comprised, one of the layers corresponding to the first adsorption layer, which is relatively close to the main adsorption chamber, and the other one corresponding to the second adsorption layer, which is relatively close to the atmosphere port 13 and has a lower performance of adsorbing fuel vapor than the first adsorption layer does. The first adsorption layer and the second adsorption layer may not be disposed adjacent to each other. The layered portion 50 may be configured such that any adsorption layer having a higher performance of adsorbing fuel vapor than the second adsorption layer is not disposed at a position closer to the atmosphere port 13 than the second adsorption layer. There may be other adsorption chambers or adsorption layers arranged in front and/or rear of the high-desorption layer 60 along the flow direction of fuel vapor. A grid such as a porous plate may be provided between the layered portion 50 and the high-desorption layer 60. The sub adsorption chamber may be configured by a plurality of chambers. For example, the layered portion 50 and the high-desorption layer 60 may be disposed in different chambers. The first adsorption layer 51 and the second adsorption layer 52 may be disposed in different chambers.

Figure 2:
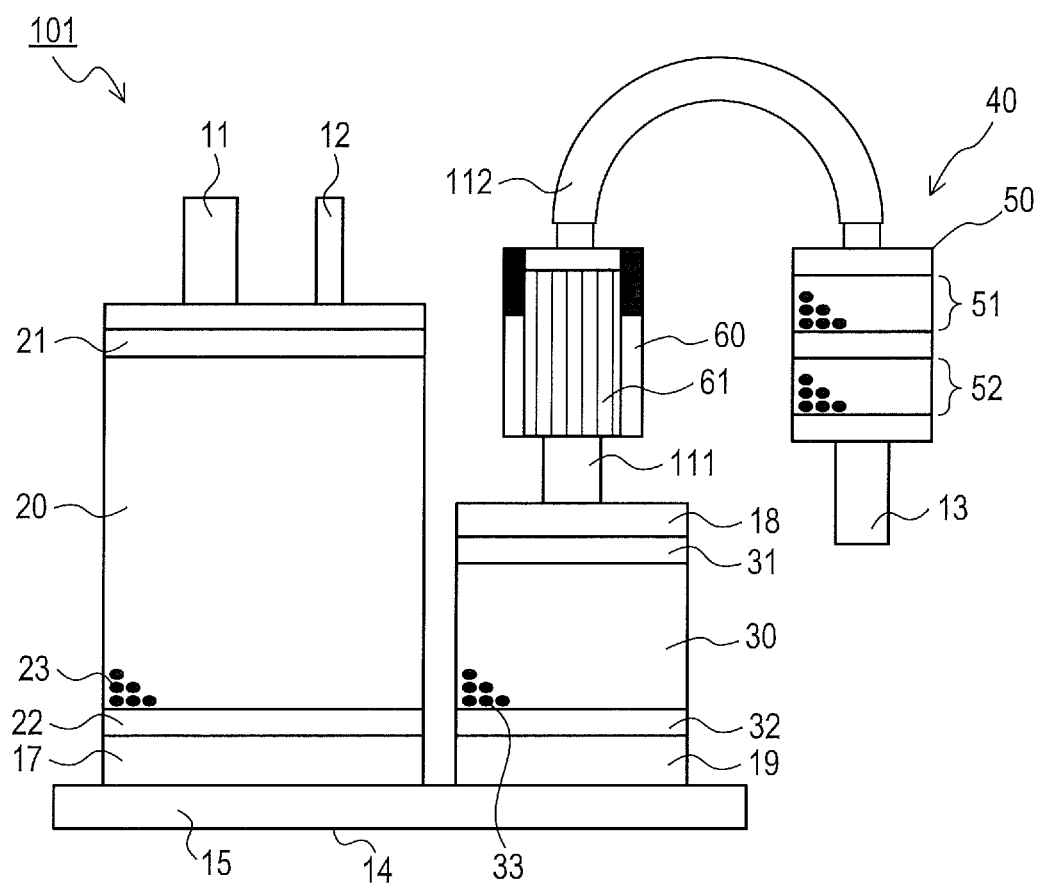
FIG. 2 is an explanatory diagram schematically showing an internal structure of an evaporated fuel treatment device according to a modified example.

Furthermore, similarly to the evaporated fuel treatment device 101 shown in FIG. 2, the second main adsorption chamber 30 and the high-desorption layer 60 may be connected via a flexible tube 111, or the high-desorption layer 60 and the layered portion 50 may be connected via a flexible tube 112. One or more flexible tubes may be used to connect the chambers. In this configuration, a position to dispose the evaporated fuel treatment device 101 can be determined more flexibly.

(2e) A function/functions performed by one element may be performed by a plurality of elements, or functions performed by a plurality of elements may be integrally performed by one element. A part of the configurations of the above embodiments may be omitted. At least a part of the configurations of the above embodiments may be added to or replaced by the configuration of the other embodiment.

What is claimed is:

1. An evaporated fuel treatment device comprising:
an inflow port; an outflow port; and an atmosphere port,
wherein the evaporated fuel treatment device is configured to accumulate fuel vapor flowing in from a fuel tank via the inflow port, and to cause the accumulated fuel vapor to flow out to an internal combustion engine via the outflow port by using air flowing in from the atmosphere port, the evaporated fuel treatment device further comprising:
a main adsorption chamber that is connected to the inflow port and the outflow port and provided therein with an adsorbent for adsorbing the fuel vapor; and
a sub adsorption chamber that is connected to the atmosphere port and provided therein with an adsorbent for adsorbing the fuel vapor,
wherein the sub adsorption chamber comprises:
a first adsorption layer;
a second adsorption layer that is situated closer to the atmosphere port than the first adsorption layer is, and has a lower performance of adsorbing the fuel vapor than the first adsorption layer does; and
a high-desorption layer that is situated closer to the main adsorption chamber than the first adsorption layer is, and has a higher performance of desorbing the fuel vapor than the first adsorption layer or the second adsorption layer does.

2. The evaporated fuel treatment device according to claim 1,
wherein the high-desorption layer is provided therein with an activated carbon formed in honeycomb shape.

3. The evaporated fuel treatment device according to claim 1,
- wherein the main adsorption chamber comprises a first main adsorption chamber and a second main adsorption chamber that are connected to each other via a communicating passage, and
- wherein the first main adsorption chamber and the second main adsorption chamber are arranged such that, when the fuel vapor flows in from the fuel tank, a flow direction of the fuel vapor in the first main adsorption chamber and a flow direction of the fuel vapor in the second main adsorption chamber are opposite directions to each other, and such that the first main adsorption chamber and the second main adsorption chamber are aligned along a direction perpendicular to the flow direction of the fuel vapor in the first main adsorption chamber.

4. The evaporated fuel treatment device according to claim 1,
- wherein the first adsorption layer and the second adsorption layer comprise activated carbons as adsorbents.

5. The evaporated fuel treatment device according to claim 1,
- wherein the adsorbent provided in the high-desorption layer includes a thin-plate-shaped portion.

6. The evaporated fuel treatment device according to claim 5,
- wherein the first adsorption layer and the second adsorption layer comprise granular or pellet-formed members as adsorbents, and
- wherein the thin-plate-shaped portion is thinner than the granular or pellet-formed members.

\* \* \* \* \*